Aug. 28, 1962     K. PAULE ET AL     3,051,152
FUEL CONTROL ARRANGEMENT
Filed Sept. 17, 1958     3 Sheets-Sheet 1
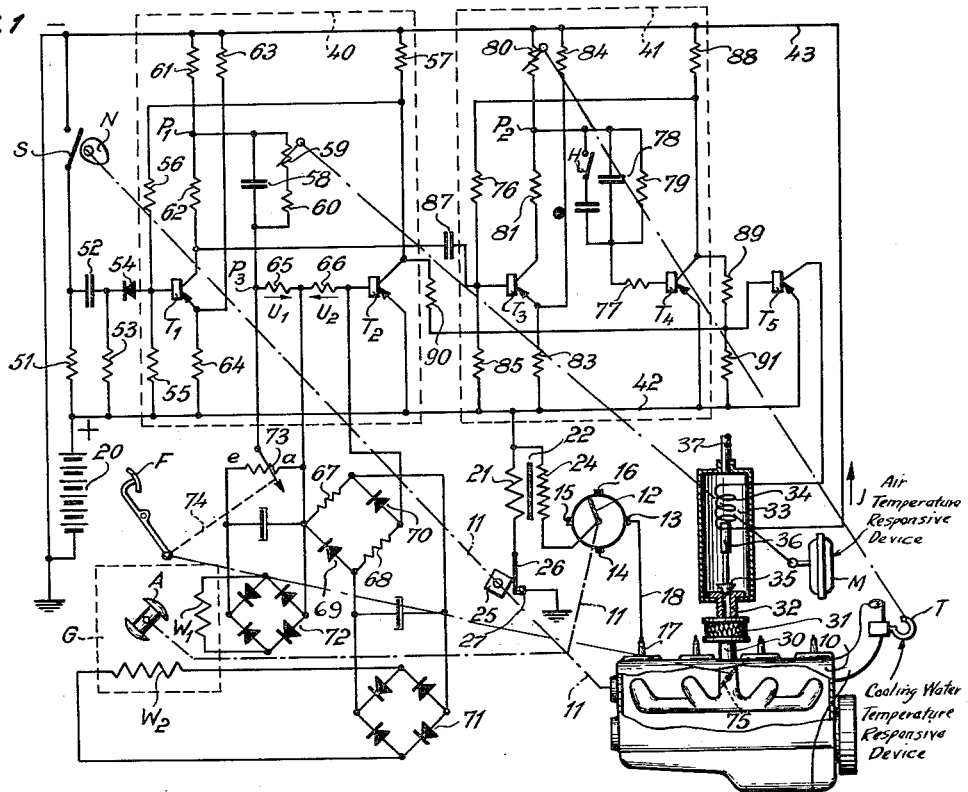
INVENTORS
Kurt Paule, Heinrich Knapp,
Richard Zechnall and
Otto Schütte
by: Michael S. Striker
Attorney Aug. 28, 1962  K. PAULE ET AL  3,051,152
FUEL CONTROL ARRANGEMENT
Filed Sept. 17, 1958  3 Sheets-Sheet 3

INVENTORS
Kurt Paule, Heinrich Knapp
Richard Zechwall and
Otto Schütte
by: Michael S. Striker
Attorney

United States Patent Office 3,051,152
Patented Aug. 28, 1962

3,051,152
FUEL CONTROL ARRANGEMENT
Kurt Paule, Stuttgart-Oberturkheim, Heinrich Knapp and Richard Zechnall, Stuttgart, and Otto Schütte, Darmstadt, Germany, assignors to Firma Robert Bosch G.m.b.H., Stuttgart, Germany
Filed Sept. 17, 1958, Ser. No. 761,551
Claims priority, application Germany Sept. 18, 1957
20 Claims. (Cl. 123—119)

The present invention relates to a fuel control arrangement for combustion engines and more particularly to a control arrangement including a monostable circuit which determines the time period during which fuel is injected into the combustion engine in accordance with the rotary speed of the combustion engine.

The present invention also relates to an arrangement by which the time period during which fuel is supplied to the engine is not only controlled in accordance with the rotary speed of the engine, but also in accordance with the temperature of the engine.

At full load on the combustion engine, it is necessary that the amount of fuel injected during each working stroke rises proportional with the rotary speed, maintains a maximum within a wide range of the medium rotary speeds, and is reduced only in the range of the higher rotary speeds.

It is one object of the present invention to improve the fuel control arrangements of the known art, and to provide a fuel control arrangement which obtains the desired stoichiometric ratio between fuel and air at all speeds of the combustion engine.

Another object of the present invention is to obtain the desired stoichiometric ratio at all temperatures of the engine.

A further object of the present invention is to control the time period during which fuel is injected into a combustion engine in accordance with the rotary speed and the number of revolutions of the combustion engine.

A further object of the present invention is to control the time period during which fuel is supplied to the combustion engine in accordance with the quantity of the fuel air mixture supplied to the combustion engine.

With these objects in view, the present invention mainly consists in a fuel control arrangement which comprises, in combination an electrical operating device for operating the fuel supply means, for example fuel injection means, of a combustion engine; at least one monostable circuit connected to the operating device for actuating the same, and including a timing device operable between an inoperative condition and an operative condition for holding the operating device actuated, and passing from the operative condition to the inoperative condition after variable time periods; and means, for example a generator, driven by the combustion engine for producing a variable voltage depending on the rotary speed of the combustion engine. The timing device is preferably placed in operative condition under control of a cam means driven from the combustion engine. The generator means are connected to the timing device, which preferably includes a capacitor and a resistor means, so that the timing device is controlled to vary the variable time periods in accordance with the variable voltage produced by the generator. Consequently, the time during which fuel is injected into the combustion engine depends on the rotary speed of the combustion engine, and the apparatus can be designed in such a manner that the amount of fuel injected into the combustion engine during the variable time period is exactly the amount required for producing a desired stoichiometrical ratio at all rotary speeds of the combustion engine.

Preferably, the circuit means connecting the generator with the timing device includes a non-linear bridge circuit composed of resistor means and rectifier means.

According to a preferred embodiment of the present invention, the variable voltage supplied by the generator is further modified under control of the throttle control member which controls the admission of the fuel mixture to the combustion engine. In one embodiment of the present invention a potentiometer is provided with a variable tap which is connected to a foot pedal controlling the throttle control member. According to a preferred embodiment of the present invention, the time period during which the fuel injection means of the combustion engine are actuated, is not only depending on the number of revolutions of the combustion engine, but also on the temperature of the cooling water of the combustion engine.

In this embodiment, another monostable circuit is provided which also includes a timing device. The fuel supply means is controlled by the second monostable circuit, which on the other hand is controlled by the first monostable circuit so that the actual time period in which the fuel supply means are actuated is the total of both time periods.

The generator used in the arrangement is preferably an alternating current generator having permanent exciting magnets which is advantageously arranged on the distributor shaft of the ignition means of the combustion engine. When an alternating current generator is used, the supplied variable voltage can be influenced by frequency responsive elements such as impedance coils or capacitors so that the variable voltage which controls the timing device is automatically modified depending upon the rotary speed of the combustion engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is a diagram illustrating the circuit of one embodiment of the present invention, and showing in a schematic manner the distributor shaft and the fuel injection means of the combustion engine;

FIGURE 2 is a diagram representing the operation by graphs;

Figure 3:
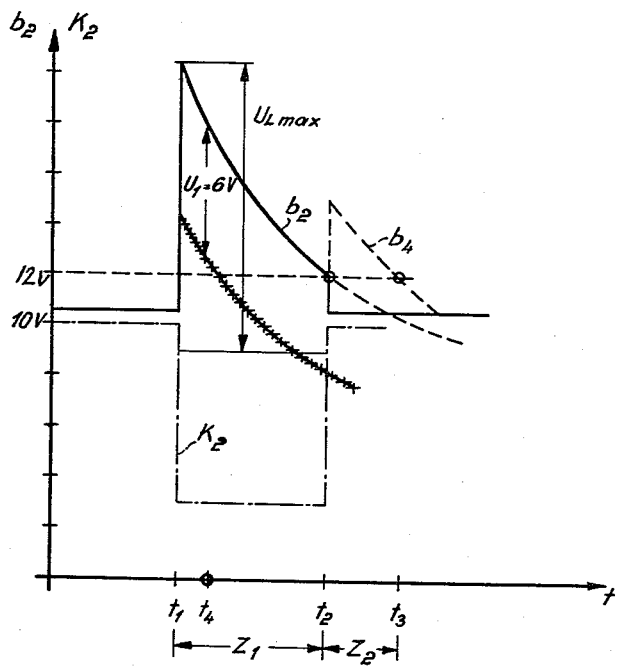
FIGURES 3 and 4 are diagrams illustrating operational conditions prevailing in the arrangement of the present invention by graphs.

Referring now to the drawings, and more particularly to FIGURE 1, the four-cylinder combustion engine 10 drives a distributor shaft 11 at the speed of the cam shaft. Distributor shaft 11 is schematically shown by three dash and dot lines in order to permit a showing of the several elements driven therefrom. Distributor shaft 11 rotates a distributor arm 12 which successively sweeps four distributor contacts 13, 14, 15, and 16. Each distributor contact is connected by a cable 18 to a spark plug 17 of the combustion engine. Only one cable 18 is shown for the sake of clarity.

A 12 volt battery 20 is connected to the primary low tension winding 21 of an ignition coil which carries on its core 22 a high tension winding 24 which is also connected to the battery 20. Winding 21 is supplied with current from the battery, when the breaker cam 25 of the ignition means urges the breaker arm 26 against the stationary contact 27 which is connected to ground. Breaker cam 25 is also fixed on the distributor shaft 11. Every time the breaker arm 26 is disconnected from contact 27 and interupts the current flowing from battery 20 to the primary winding 21 of the ignition coil, a high tension is induced in the high tension winding 24 which is connected by distributor arm 12 to one of the four spark plugs 17.

A throttle control member 75 is located in the air inlet tube 30 which communicates with the air inlet means 31. Throttle control member 75 is operatively connected to a foot pedal F as indicated by a broken line in FIG. 1. An injection nozzle 32 controlled by a valve member 35 extends into the air inlet 31. Valve member 35 is connected to an armature 36 controlled by a winding 34. Fuel is pumped into the casing 33 through a pipe 37 which is connected to a fuel pump, not shown. It is therefore apparent that the electro-magnetic operating means 34, 36 control and operate the fuel supply means 32, 35 in such a manner that as long as a current J flows through winding 34, fuel passes through nozzle 32 into the air inlet means 31 and is there mixed with air to pass into the inlet tube 30 where the quantity of mixture admitted to the combustion engine is controlled by throttle control member 75. The longer valve member 35 is raised from its seat, the more fuel will pass from the nozzle 32 into the combustion engine.

The above described electrical operating means for the fuel supply means of the combustion engine are controlled by a circuit which will now be described with reference to the upper portion of FIG. 1.

Two monostable circuits are provided which are respectively surrounded by broken line boxes and indicated by reference numerals 40 and 41. Each monostable circuit is capable of delivering a current impulse of variable length while in an operative position, and tends to return automatically to an inoperative position. Each monostable circuit can be placed by a control impulse in the operative unstable condition during which it controls and holds valve member 35 in open position. Consequently, the time period during which the monostable circuits are in operative unstable condition determine the amount of injected fuel.

A timing device is provided in each monostable circuit and includes a capacitor and a parallel resistor for maintaining the operative condition of the circuit until the capacitor has discharged.

The monostable circuit 40 controls the fuel supply depending on the rotary speed of the combustion engine 10, whereas the monostable circuit 41 produces a second impulse following the impulse delivered by the monostable circuit 40, so that the fuel supply means are held in actuated condition for a time period which is the total of the two time periods during which the timing devices are operative. The second monostable circuit 41 is capable of holding the fuel supply means in actuated condition for a second time period which depends on the temperature of the combustion engine. The effect of the second monostable circuit 41 is to extend the fuel supply time when the combustion engine is cold.

Circuits 40 and 41 supply impulses to a common line 42 which is connected to a power transistor $T_5$ and to the positive terminal of the battery 20. Transistor $T_5$ is connected to winding 34 whose other end is connected by a line 43 to the negative terminal of the battery and to ground. The circuits 40 and 41 are also connected to the negative line 43.

A cam means N is fixed on, or driven by, the distributor shaft 11 which is rotated by the combustion engine. A contact arm S is operated by cam N in timed relation with the strokes of the combustion engine 10. Switch S is connected in series with a resistor 51 of approximately 20 kilohms between the positive line 42 and the ground line 43. Between switch S and resistor 51, a coupling capacitor 52 is connected which is connected by a resistor 53 to line 42, and also to germanium diode 54 whose other electrode is connected to the base of a transistor $T_1$. Another resistor 55 of 5 kilohms connects the base of transistors $T_1$ to positive line 42, while a resistor 56 connects the base of transistor $T_1$ to the collector of another transistor $T_2$ this collector is connected by a resistor 57 of 5 kilohms with the ground line 43. The emitter of transistor $T_2$ is directly connected to the positive line 42.

The timing device of the monostable circuit 40 includes a capacitor 58, and two resistors connected in series and being parallel to capacitor 58. Resistor 59 and capacitor 58 are connected to a point $P_1$ between two resistors 61 and 62. Resistor 62 is connected to the collector of transistor $T_1$, and resistor 61, which has 5 kilohms, is connected to the ground line 43. Resistor 62 has only 1.2 kilohms. The emitter of transistor $T_1$ is connected by a resistor 63 of 5 kilohms to ground line 43, and by a resistor 64 of 500 ohms to positive line 42.

Resistor 59 of the timing device 58, 59, 60 is variable depending on the pressure and temperature of the surrounding air, for example by the action of a membrane, barometric device M having a membrane connected to the movable tap of potentiometer 59, as schematically shown in FIG. 1. Resistor 60 is invariable. Assuming a capacity of 0.1 mf. of capacitor 58, the resistance of resistors 59 and 60 should not exceed a total of 150 kilohms.

Two series connected resistors 65 and 66 connect one side of capacitor 58 with the base of transistor $T_2$.

A generator G has a rotary armature A consisting of permanent magnets and driven by shaft 11. The generator has a first winding $w_1$ in which a voltage of about 30 volts is induced when the shaft 11 rotates at 3,000 revolutions per minute. At this rotary speed, the alternating voltage produced in a second winding $w_2$ is approximately 3 volts.

The alternating voltage produced in winding $w_2$ passes through rectifying means 71 consisting of four rectifiers connected in a Graetz rectifier circuit, and the rectified voltage passes through a non-linear bridge comprising two resistors 67 and 68 of 2.8 kilohms and two rectifiers 69, 70, and is then supplied to resistor 66.

Coil $w_1$ has about 10 times as many windings as coil $w_2$ and is connected to a Graetz rectifier circuit 72 which supplies a direct voltage to the potentiometer 73 of 15 kilohms. The movable tap member of potentiometer 73 is connected by a linkage 74 to the foot pedal F by which the throttle control member 75 of combustion engine 10 is operated. The linkage between foot pedal F and the throttle control member 75 is schematically shown as a broken line in FIGURE 1 for the sake of clarity. When the foot pedal is depressed, the movable arm of the potentiometer 73 is displaced to reduce the direct current voltage supplied to resistor 65.

The monostable circuit 41 includes two transistors $T_3$ and $T_4$. The base of transistor $T_3$ is connected by a resistor 76 of 10 kilohms with the collector of transistor $T_4$, and the base of transistor $T_4$ is connected by resistor 77 of 1.2 kilohms and a timing device to a point $P_2$ between a resistor 80 and a resistor 81 which is connected to the collector of transistor $T_3$. The timing device includes a capacitor 78 and a parallel resistor 79. Resistor 81 has 5 kilohms and is connected in series with resistor 80 which is connected to ground line 43. Resistor 80 has a movable top which is controlled by means which are in heat conductive connection with the cooling water of the combustion engine 10 as schematically indicated at T in FIG. 1. An arcuate tube, filled with a liquid whose volume changes considerably with the temperature, is soldered into the cooling water pipe of the engine and is connected by a linkage indicated by a dash-dot line to the tap of potentiometer 80 to adjust the resistance 80 in accordance with the temperature of the cooling water when the arcuate tube bends in response to a variation of the temperature. The resistance of resistor 80 is higher at low water temperatures and lower at high water temperatures. The potential of the emitter of transistor $T_3$ is determined by a voltage divider consisting of a resistor 83 connected to the positive line 42 and a resistor 84 of 5 kilohms which is connected to the ground line 43. Another resistor 85 of 5 kilohms connects the base of transistor $T_3$ with the positive line 42, and a capacitor 87 of 0.001 mf. connects the base of resistor $T_3$ to the collector of transistor $T_1$. A resistor is located in the line connecting the collector of transistor $T_4$ with the ground line 43. A further resistor 89 of 80 kilohms is connected to the collector of transistor $T_4$ and to the base of transistor $T_5$. The base of transistor $T_5$ is connected by another resistor 90 of 80 kilohms with the collector of transistor $T_2$ and with the positive line 42 by a resistor 91 of four kilohms. The emitter of transistor $T_5$ is directly connected to the positive line 42, and its collector current passes through the winding 34 of the electromagnetic means which operate valve member 35. Consequently, valve member 35 is opened and closed for time periods determined by the control impulses supplied by the two monostable circuits 40 and 41.

In the following description of the operation of the circuit of the present invention, it is assumed that the combustion engine 10 runs at a constant number of revolutions which is determined by the amount of fuel injected and by the load. It is also assumed that the winding $w_1$ of generator G supplies an alternating voltage which is sufficient to produce in the illustrated position of the movable tap of potentiometer a direct voltage $U_1$ of two volts which is applied to the resistor 65. At this number of revolutions, the voltage induced in winding $w_2$, rectified by rectifier 71 and applied through bridge 67, 68, 69, 70 to resistor 66 is assumed to produce a control voltage $U_2$ of 0.5 volt which is opposite to the control voltage $U_1$ for numbers of revolutions below 3,000 revolutions per minute. The potentials created at the electrodes of transistors $T_1$ to $T_5$ are referred to in the following description as follows:

| Transistors | $T_1$ | $T_2$ | $T_3$ | $T_4$ | $T_5$ |
|---|---|---|---|---|---|
| Potential of: | | | | | |
| Base | $b_1$ | $b_2$ | $b_3$ | $b_4$ | $b_5$ |
| Emitter | $e_1$ | $e_2$ | $e_3$ | $e_4$ | $e_5$ |
| Collector | $k_1$ | $k_2$ | $k_3$ | $k_4$ | $k_5$ |

As long as switch S is held open by the rotating cam N, transistor $T_1$ is shut off and transistor $T_2$ is conducting. The potential $k_2$ of transistor $T_2$ about 10 volts. The potential $b_1$ at the base of transistor $T_1$ is determined by resistors 55 and 56 and will assume a value of 11.3 volts if the battery voltage is 12 volts. The potential $e_1$ of the emitter of transistor $T_1$ is determined by resistors 63 and 64 and is 10.9 volts. Since potential $b_1$ is greater than the emitter potential $e_1$, no current can flow from the emitter to the base of transistor $T_1$, and transistor $T_1$ is shut off.

The potential $p_1$ of point $P_1$ is then substantially determined by the voltage differential along resistor 61 produced by the current flowing from the base of transistor $T_2$ through resistors 66, 65, 60, 59 and 61.

Assuming a base potential $b_2$ of transistor $T_2$ of 10.5 volts, the potential $p_3$ at $P_3$ between the discharge resistor 60 of the timing device and resistor 65 is about 12 volts, considering the control voltage $U_1$ at resistor 65 and the control voltage $U_2$ at resistor 66. As explained above, these control voltages are produced, respectively, by the windings $w_1$ and $w_2$ of generator G.

Assuming the constant resistor 60 to have 50 kilohms and momentary resistance of 15 kilohms of resistor 59 which is pressure responsive, at point $P_1$ results a potential $p_1$ of about 0.8 volt. When switch S is opened, capacitor 58 is charged by a voltage $U_L$ of 12–0.8 volts which is 11.2 volts.

As soon as cam N closes switch S, the base potential $b_1$ of transistor $T_1$ is reduced to substantially zero through the discharged coupling capacitor 52 for a short time since capacitor 52 is discharged and consequently conducting. At this moment, a control current can flow from the emitter of transistor $T_1$ to its base so that transistor $T_1$ is conducting to such extent that its collector current reaches 1.8 ma. and the potential $p_1$ of point $P_1$ rises to about 9 volts. Since capacitor 58 has its full charging voltage $U_L$ max. of 11.2 volts, the potential $b_2$ of the base of transistor $T_2$ is increased above its emitter potential $e_2$ of 12 volts and assumes a value of $p_1$ plus $U_L$ which is 20.2 volts. At such a high base potential, no control current can flow from the emitter to the base of transistor $T_2$, and transistor $T_2$ is shut off. In this condition, transistor $T_2$ has a collector potential $K_2$ of 3 volts which is substantially determined by current flowing through resistors 55, 56 and 57. This current produces at the resistor 55 a potential $b_1$ of 9 volts which is sufficient for the emitter potential $e_1$ of 10.9 volts to maintain transistor $T_1$ in conducting position even if switch S has again opened, and the current impulse through the coupling capacitor 52, which has been charged in the meantime, has terminated.

The monostable circuit 40 returns to its initial inoperative position only after capacitor 58 of the timing device has been discharged from its initial voltage $U_L$ of 11.2 volts to such extent that the potential $b_1$ at the base of transistor $T_2$ drops below the value of the emitter potential $e_2$ which is 12 volts. At this moment, transistor $T_2$ becomes conducting.

The above described conditions are graphically illustrated in FIGURE 3. The ordinates represent potentials and voltages, and the abcissas represent time.

The base of transistor $T_2$ maintains its potential $b_2$ of 10.5 until switch S closes at the time $t_1$ in which moment the potential $b_2$ becomes 20.2 volts. From this moment on, no base current can flow through transistor $T_2$ and resistors 59 and 60, so that capacitor 58 of the timing device discharges within a time period determined by the resistors 59 and 60. The voltage $U_L$ of capacitor 58 drops very rapidly in accordance with an exponential function. The potential $b_2$ of transistor $T_2$, which was raised by the voltage of the capacitor, finally drops at the time $t_2$ below the emitter potential of 12 volts, so that transistor $T_2$ becomes again conducting.

The collector current $J_2$ of transistor $T_2$ produces a voltage differential along resistor 57 by which the potential $b_1$ of the base of transistor $T_1$ is increased so that the current acting on the base potential $b_2$ of transistor $T_2$ is reduced to such extent that potential $p_1$ of point $P_1$ drops. This has a strong effect on transistor $T_2$, which is connected to point $P_1$ through the timing device, so that the collector current $J_2$ of transistor $T_2$ further increases. This effects a faster return of transistor $T_1$ to its initial shut off condition.

The collector potential $k_2$ of transistor $T_2$ follows the dash and dot line in FIGURE 3. Before closing of switch S at time $t_1$, potential $k_2$ is 10 volts, it then drops to 3 volts while transistor $T_2$ is shut off, and remains at 3 volts until the capacitor 58 has discharged to such extent that the base potential $b_2$ of the transistor has dropped below 12 volts at the time $t_2$. At this moment, transistor $T_1$ is shut off again, transistor $T_2$ becomes conducting, and the collector potential $k_2$ is abruptly raised to its initial value of 10 volts.

It is necessary that the injection valve 33 is kept open in the time period $Z_1$ between the time moment $t_1$ and $t_2$. Transistor $T_5$, which is connected in series with the electromagnetic operating means 34 of valve 35, has its base connected to the collector of transistor $T_2$ through resistor 90. Every time switch S closes at the moment $t_1$ the current J of transistor $T_5$ flows through winding 34. If the current were determined only by the monostable circuit 40, it would terminate as soon as transistor $T_2$ becomes conducting at the moment $t_2$. In accordance with a preferred embodiment of the present invention, the time period $Z_1$ during which injection takes place is extended by a second impulse which is delivered by the monostable circuit 41 so that the injection time is increased a time period $Z_2$.

A coupling capacitor 87 is connected between the base of transistor $T_3$ of the monostable circuit 41 and the collector of transistor $T_1$ of the circuit 40. Coupling capacitor 87 has a similar function as coupling capacitor 52 which starts the operation of the monostable circuit 40. As soon as transistor $T_1$ returns at the moment $t_2$ to its shut off condition, and its collector potential $k_1$ is reduced to a value which is close to zero, transistor $T_3$ becomes conducting, and places the monostable circuit 41 into its operative unstable condition. The collector potential $k_1$ is only determined by the voltage division produced by resistors 63 and 64, which are variable between 20 and 150 kilohms, and by resistor 66 which has 5 kilohms.

In the initial position of the monostable circuit 41, transistor $T_3$ is shut off, and transistor $T_4$ is conducting. The collector potential $k_4$ of transistor $T_4$ is then about 10 volts, so that transistor $T_3$ has a base potential $b_3$ of 11.3 volts due to the voltage division by resistors 76, which has 10 kilohms, and resistor 85 which has 5 kilohms. At this base potential of 11.3 volts, transistor $T_3$ is not conducting, since its emitter potential $e_3$ is held at a constant value of 11.7 volts by the voltage divider comprising the resistor 84, which has 5 kilohms, and 83 which has 100 ohms. Consequently no current can flow between emitter and base of transistor $T_3$.

When a negative control impulse arrives at transistor $T_3$ at the moment $t_2$, transistor $T_3$ becomes conducting and produces a potential of about 7 volts at capacitor 78 which is a component of the timing device of the monostable circuit 41. Capacitor 78 is charged to a voltage of 12 minus 4, that is to 8 volts, and increases the base potential $b_4$ of transistor of $T_4$ to a value of 7 plus 8, that is 15 volts, so that transistor $T_4$ shuts off. Only after capacitor 78 has discharged through its associated resistor 79, which has 50 kilohms, and the base potential $b_4$ of transistor $T_4$ is about 12 volts at the moment $t_3$, transistor $T_4$ can again become conducting, and effect closing of the injector valve 35 which has thus been kept open beyond the time moment $t_2$.

At the moment $t_3$, a collector current starts to flow through resistor 88 which increases the collector potential $k_4$ of transistor $T_4$ to approximately 12 volts, so that the base of transistor $T_5$ has a higher positive potential than the emitter potential $e_5$ resulting in shut off of transistor $T_5$. Transistor $T_5$ is connected to both circuits 40 and 41 through resistors 89 and 90, respectively. Resistors 89 and 90 have a comparatively high resistance, 80 kilohms, so that the two circuits 40 and 41 cannot influence each other.

As explained above, the effective resistance of temperature responsive resistor 79 drops when the temperature of the cooling water of the combustion engine rises. Consequently, the collector current of transistor $T_3$, which starts at the beginning of the time period 22, cannot increase the potential of point $P_2$ to the same extent at high temperatures, as at low temperatures. At high temperatures of the cooling water and of the combustion engine, capacitor 77 will be sooner discharged to a reduced voltage at which the base potential $b_4$ of transistor $T_4$ is again below the base potential of 12 volts so that a base current and a collector current can again flow through transistor $T_4$.

The total injection time period $Z_1$ and $Z_2$ can be further influenced by the operator when the same depresses the foot pedal F. Generator G produces, in addition to the control voltage $U_1$ which is taken from the potentiometer 73, another control voltage $U_2$ which effects a desired increase of the amount of injected fuel in the medium range of rotary speed during full load operation of the combustion engine. Voltages $U_1$ and $U_2$ as well as the variable tap of potentiometer 73 have interrelated effects, and for the purpose of explanation, it will now be assumed that the combustion engine idles so that the influence of the non-linear bridge 67 and 70 can be neglected. It is further assumed that the foot pedal F holds the tap of potentiometer 73 near its end position $e$.

The voltage $U_1$ is determined by the potentiometer 73 and increases with the rotary speed of the combustion engine in a linear function. However, this does not substantially influence the voltage $U_L$ of capacitor 58, when the same is charged through transistor $T_2$ while transistor $T_1$ is shut off. Since the charging current also flows through resistor 65 and 66 and produces a voltage differential which is opposite to the voltage $U_1$ received from the potentiometer 73, the charging voltage remains practically unchanged irrespective of the increasing voltage of the generator.

On the other hand, the generator voltage has a substantial influence on the time period $Z_1$, when the transistor $T_1$ is switched to conducting condition and raises the potential of point $P_1$ to 9 volts. When the connecting point $P_1$ of the timing device has this voltage, no base current can flow through transistor $T_2$ and consequently the compensating effect of the voltage differential at the resistor 65 and 66 is eliminated, and the voltage $U_1$ of the potentiometer is fully effective. This voltage $U_1$ is opposite to the charging voltage $U_L$, and consequently prevents an increase of the base potential $b_2$ to 20.2 volts so that the voltage $U_2$ remains below this value.

This is indicated in FIGURE 3 by a graph consisting of small crosses and being substantially parallel to graph $b_2$ and separated by the same by a distance representing voltage $U_1$, which is 6 volts.

The base potential of transistor $T_2$ follows the function represented by this graph, and consequently it drops to 12 volts, which corresponds to the emitter potential, at the moment $t_4$ which is much earlier than $t_2$.

In the event that the cooling water temperature of the combustion engine is above 60° C. so that the second monostable circuit 41 cannot produce an additional impulse for extending the injection time by the time period $Z_2$, the injection is terminated at the early moment $t_4$.

It follows that the fuel amount injected during each working stroke of the combustion engine is very rapidly increased when the rotary speed of the combustion engine increases while the foot pedal F is in idling position. The conditions are illustrated in the diagram of FIGURE 2 in which the ordinates represent the injected fuel amounts M and the associated time periods $Z_1$ for a cooling water temperature above 60° C. The abscissas represent the number of revolutions of the distributor shaft 11.

The graphs represent the conditions present when the throttle valve member 75 is turned through different angles by operation of the foot pedal F with which it is connected by a linkage, not shown. For example, when the throttle valve member is opened 2.5°, the fuel volume is 28 mm.³/stroke and the injection time period is 5.6 m. sec. for 250 revolutions per minute. At 500 revolutions per minute, the volume is only 15 mm.³/stroke and at 750 revolutions per minute the volume is only 7 mm.³/stroke.

The influence of the generator voltage $U_1$ which shortens the injection time period, becomes less effective as the foot pedal F is more depressed and the tap of potentiometer 73 is shifted towards the beginning of the potentiometer winding $a$. Of course, at the same time the opening angle of the throttle control member 75 is increased, and for a throttle angle of 60°, the graph shows an almost constant fuel volume.

Figure 4:
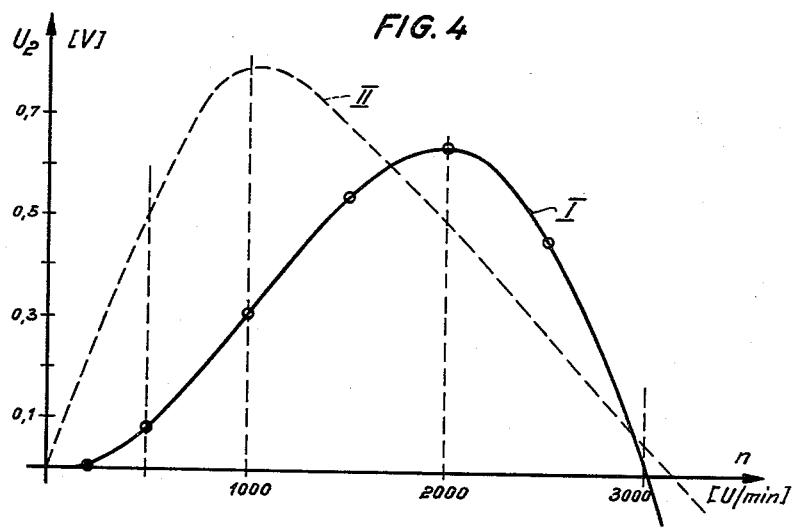

The graph representing the conditions for an opening angle of 80° of the throttle control member shows a higher portion within the range between 1,000 and 2,500 revolutions per minute which is caused by the second control voltage $U_2$ effective on the resistor 66. The non-linear bridge including resistors 67, 68 and selenium rectifiers 69 and 70 produces, as explained above, a control voltage $U_2$ which is opposite to control voltage $U_1$, and is substantially increased as the number of revolutions rises to 1500 revolutions per minute, and then remains at a maximum value until the number of revolutions is increased above 2000 revolutions per minute, where the control voltage $U_2$ drops again. FIGURE 4 illustrates by graph I the variations of the control voltage $U_2$ depending on the number of revolutions of the combustion engine.

The selenium rectifiers 69 and 70 consist of two selenium plates connected in series. If it is desired to adapt the fuel control arrangement of the present invention to another combustion engine which has different fuel requirements, rectifiers having only a single selenium plate can be used together with bridge resistors of about 500 ohms. A control voltage $U_2$ is then obtained, whose maximum is reached at about 1,000 revolutions per minute, and has a flatter peak as shown by graph II in FIGURE 4. Thereby advantageous conditions for operation under full load can be obtained within a lower range of rotary speeds of the combustion engine.

Figure 5:
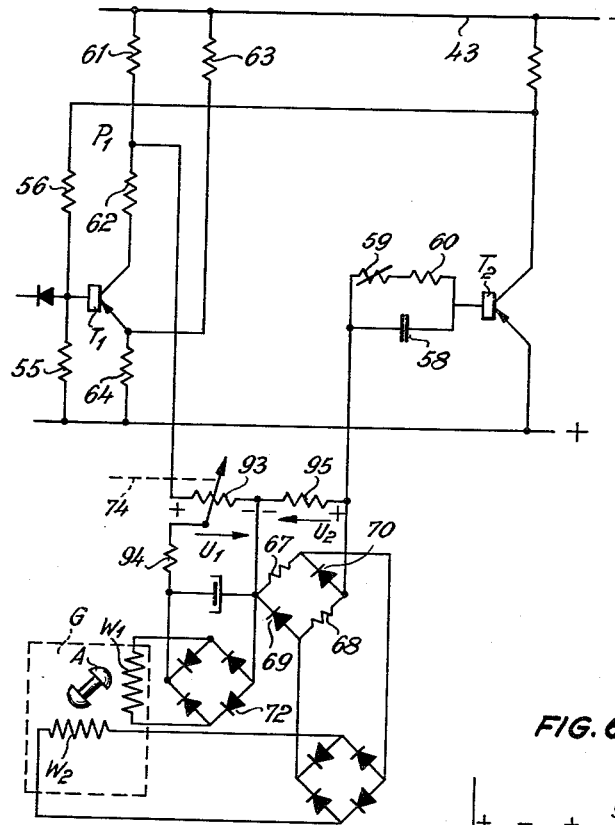
FIGURE 5 is a fragmentary diagram illustrating a modification of the arrangement shown in FIGURE 1 in accordance with another embodiment of the present invention.

FIGURE 5 shows a modified arrangement in a fragmentary diagram which replaces part of the diagram of FIGURE 1 in a modified embodiment of the present invention.

Generator G is so connected to the monostable circuit 40 that the timing device 58, 59, 60 is directly connected to the base of transistor $T_2$. Since the resistors 59 and 60 have a comparatively high resistance, the capacitive influence on the impulse time periods is substantially reduced, since the generator is connected to the ground line 43 through resistor 61 which is associated with transistor $T_1$ and has a comparatively low resistance.

Furthermore, it is advantageous for use with certain types of combustion engines that the voltage induced in winding $w_1$ of the generator and rectified by rectifier means 72, is applied to the potentiometer 93 of 5 kilohms through a resistor 94 of 5 kilohms at the tap of the potentiometer, while the end $e$ of potentiometer 93 is connected to the point $P_1$ between resistors 61 and 62. In the thus modified circuit, the timing device is connected with variable resistor 59 to a resistor 95 connected in parallel to the output of the non-linear bridge 67, 68, 69, 70. The resistance of resistor 95 is 2 kilohms.

Figure 6:
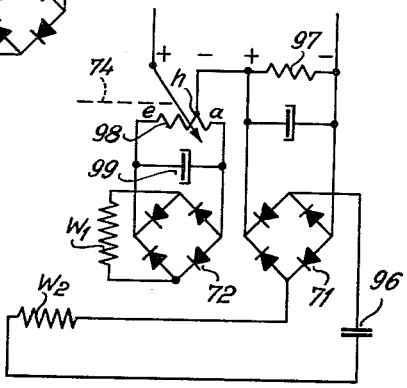
FIGURE 6 is a fragmentary diagram showing a modification of the arrangement shown in FIGURE 1 in accordance with a further embodiment of the present invention.

In a third modification illustrated in the fragmentary diagram of FIGURE 6, which is to be substituted for a corresponding portion of the diagram of FIGURE 1, the non-linear bridge is omitted, and a capacitor 96 is provided in the circuit of the generator winding $w_2$, which serves as a frequency responsive series resistance. The output of a Graetz rectifier circuit 71, which consists of four selenium rectifiers, is connected in parallel with a resistor 97, and the polarity is indicated by plus and minus signs. Each of the four rectifiers has several selenium plates connected in series. Since capacitor 96 has at low rotary speeds and frequencies a substantially higher resistance for the current flowing from winding $w_2$ to resistor 97, a noticeable rise of the injected fuel amount results in the medium range of rotary speeds when the throttle is fully opened, particularly since the function graphs of rectifier 72 are greatly curved in this range of frequencies.

The modification of FIGURE 6 is further different from the embodiments of FIGURES 1 and 5, inasmuch as a potentiometer 98 is used which has a fixed tap $h$ near one end $a$ of the potentiometer. The tap $h$ is connected to resistor 97, while the point $a$ of the potentiometer 98 is connected to one of the output terminals of rectifier circuit 72. An electrolytic capacitor 99 of about 50 mf. is connected in parallel to the output of the rectifier circuit 72. If the tap $h$ is made adjustable along the potentiometer, the control voltage taken from the potentiometer 98 can be adapted to the requirements of different combustion engines within a very wide range.

It will be understood that each of the elements described above, or two or more together, may also find a useful application in other types of fuel control arrangements differing from the types described above.

While the invention has been illustrated and described as embodied in a fuel injection control arrangement, including a monostable circuit responsive to the rotary speed of the combustion engine, and another monostable circuit responsive to the temperature of the combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Fuel control arrangement comprising, in combination, an electrical operating device for operating the fuel supply means of a combustion engine; at least one monostable circuit connected to said operating device for actuating the same, and including a timing device operable between an inoperative condition, and an operative condition, for holding said operating device actuated, and passing from said operative condition to said inoperative condition after a variable time period; and means adapted to be controlled by said combustion engine for producing a variable voltage depending on the rotary speed of said combustion engine, said means being electrically connected to said timing device and controlling the same to vary said variable time period in accordance with said variable voltage and thereby depending on the rotary speed of the combustion engine whereby the time periods during which said fuel supply means supply fuel to said combustion engine are varied depending on the rotary speed of said combustion engine.

2. Fuel control arrangement comprising, in combination, an electrical operating device for operating the fuel supply means of a combustion engine; at least one monostable circuit connected to said operating device for actuating the same, and including a timing device operable between an inoperative condition, and an operative condition for holding said operating device actuated, and passing from said operative condition to said inoperative condition after a variable time period; and alternating current generator means driven by said combustion engine for producing a variable voltage depending on the rotary speed of said combustion engine, said generator means being electrically connected to said timing device and controlling the same to vary said variable time period in accordance with said variable voltage and thereby depending on the rotary speed of the combustion engine whereby the time periods during which said fuel supply means supply fuel to said combustion engine are varied depending on the rotary speed of said combustion engine.

3. Fuel control arrangement comprising, in combination, an electrical operating device for operating the fuel supply means of a combustion engine; at least one monostable circuit connected to said operating device for actuating the same, said monostable circuit including a timing device comprising a capacitor and a resistor and being operable between an inoperative condition and an operative condition for holding said operating device actuated, and passing from said operative condition to said inoperative condition after a variable time period;

alternating current generator means driven by said combustion engine for producing a variable voltage depending on the rotary speed of said combustion engine; and circuit means connecting said generator means with said timing device and including rectifier means for rectifying the alternating voltage of said generator means and resistor means whereby said variable time period is varied in accordance with said variable voltage and thereby depending on the rotary speed of the combustion engine whereby the time periods during which said fuel supply means supply fuel to said combustion engine are varied depending on the rotary speed of said combustion engine.

4. Fuel control arrangement comprising, in combination, an electrical operating device for operating the fuel supply means of a combustion engine; at least one monostable circuit connected to said operating device for actuating the same, said monostable circuit including a timing device comprising a capacitor and a resistor and being operable between an inoperative condition and an operative condition for holding said operating device actuated, and passing from said operative condition to said inoperative condition after a variable time period; alternating current generator means driven by said combustion engine for producing a variable voltage depending on the rotary speed of said combustion engine; and circuit means connecting said generator means with said timing device and including rectifier means for rectifying the alternating voltage of said generator means, non-linear resistance means, and resistor means whereby said variable time period is varied in accordance with said variable voltage and thereby depending on the rotary speed of the combustion engine whereby the time periods during which said fuel supply means supply fuel to said combustion engine are varied depending on the rotary speed of said combustion engine.

5. Fuel control arrangement comprising, in combination, an electrical operating device for operating the fuel supply means of a combustion engine; at least one monostable circuit connected to said operating device for actuating the same, said monostable circuit including a timing device comprising a capacitor and a resistor and being operable between an inoperative condition and an operative condition for holding said operating device actuated, and passing from said operative condition to said inoperative condition after a variable time period; alternating current generator means driven by said combustion engine for producing a variable voltage depending on the rotary speed of said combustion engine; and circuit means connecting said generator means with said timing device and including rectifier means for rectifying the alternating voltage of said generator means, a non-linear bridge circuit, and resistor means whereby said variable time period is varied in accordance with said variable voltage and thereby depending on the rotary speed of the combustion engine whereby the time periods during which said fuel supply means supply fuel to said combustion engine are varied depending on the rotary speed of said combustion engine.

6. Fuel control arrangement comprising, in combination, an electrical operating device for operating the fuel supply means of a combustion engine; at least one monostable circuit connected to said operating device for actuating the same, said monostable circuit including a timing device comprising a capacitor and a resistor and being operable between an inoperative condition and an operative condition for holding said operating device actuated, and passing from said operative condition to said inoperative condition after a variable time period; alternating current generator means driven by said combustion engine for producing a variable voltage depending on the rotary speed of said combustion engine; and circuit means connecting said generator means with said timing device and including rectifier means for rectifying the alternating voltage of said generator means, a non-linear bridge circuit composed of resistor means and dry rectifier means, and resistor means whereby said variable time period is varied in accordance with said variable voltage and thereby depending on the rotary speed of the combustion engine whereby the time periods during which said fuel supply means supply fuel to said combustion engine are varied depending on the rotary speed of said combustion engine.

7. Fuel control arrangement comprising, in combination, an electrical operating device for operating the fuel supply means of a combustion engine; at least one monostable circuit connected to said operating device for actuating the same, said monostable circuit including a timing device comprising a capacitor and a resistor and being operable between an inoperative condition and an operative condition for holding said operating device actuated, and passing from said operative condition to said inoperative condition after a variable time period; alternating current generator means driven by said combustion engine for producing a variable voltage depending on the rotary speed of said combustion engine; and circuit means connecting said generator means with said timing device and including rectifier means for rectifying the alternating voltage of said generator means and frequency responsive compensating resistance means, whereby said variable time period is varied in accordance with said variable voltage and thereby depending on the rotary speed of the combustion engine whereby the time periods during which said fuel supply means supply fuel to said combustion engine are varied depending on the rotary speed of said combustion engine.

8. Fuel control arrangement comprising, in combination, fuel supply means for a combustion engine and including a throttle control member movable between control positions for controlling the continuously supplied quantity of fuel mixture; an operating device for operating said fuel supply means; at least one monostable circuit connected to said operating device for actuating the same, and including a timing device operable between an inoperative condition, and an operative condition for holding said operating device actuated, and passing from said operative condition to said inoperative condition after a variable time period; and means adapted to be controlled by said combustion engine and being controlled by said throttle control member in accordance with the control positions of the same for producing a variable voltage depending on the rotary speed of said combustion engine and on the continuously supplied quantity of fuel mixture supplied to the combustion engine, said means being electrically connected to said timing device and controlling the same to vary said variable time period in accordance with said variable voltage whereby the time periods during which said fuel supply means supply fuel to said combustion engine are varied depending on the rotary speed of said combustion engine and on the continuously supplied quantity of supplied mixture fuel.

9. Fuel control arrangement comprising, in combination, fuel supply means for a combustion engine and including a throttle control member movable between control positions for controlling the continuously supplied quantity of fuel mixture; an operating device for operating said fuel supply means; at least one monostable circuit connected to said operating device for actuating the same, and including a timing device operable between an inoperative condition, and an operative condition for holding said operating device actuated, and passing from said operative condition to said inoperative condition after a variable time period; voltage producing means adapted to be controlled by said combustion engine for producing a first variable voltage and a second variable voltage, said variable voltages depending on the rotary speed of said combustion engine; first circuit means connecting said voltage producing means with said timing device for supplying said first variable voltage to the same; second circuit means connecting said voltage producing means with said timing device for supplying said second voltage to the same and including a voltage controlling means connected to said throttle control member and being controlled by the same in accordance with the control positions of the same for regulating the variable voltage supplied by said second circuit means to said timing device so that said second voltage depends on the quantity of fuel mixture supplied to the combustion engine and on the rotary speed of said combustion engine whereby the time periods during which said fuel supply means supply said quantity of fuel mixture to the combustion engine are varied depending on the rotary speed of said combustion engine and on the quantity of fuel mixture continuously supplied to the combustion engine.

10. Fuel control arrangement comprising, in combination, fuel supply means for a combustion engine and including an adjustable throttle control member for controlling the continuously supplied quantity of fuel mixture; an operating device movable to an actuated position for rendering said fuel supply means operative; at least one monostable circuit connected to said operating device for actuating the same and including a timing device operable between an inoperative condition and an operative condition for rendering said fuel supply means operative, and passing to said inoperative condition after a variable time period depending on the voltage supplied; alternating current generator means driven by said combustion engine, and having a first winding for producing a first variable voltage and a second winding for producing a second variable voltage, said variable voltages depending on the rotary speed of said combustion engine; first circuit means connecting said first winding with said timing device for supplying said first variable voltage to the same and including at least one non-linear resistance, at least one frequency responsive compensating resistance means, and at least two transistors; and second circuit means connecting said second winding with said timing device for supplying said second variable voltage to the same and including a potentiometer having a movable tap member connected to said throttle control member for movement with the same whereby said second variable voltage is modified in accordance with the amount of fuel mixture continuously supplied to the combustion engine during said time period.

11. Fuel control arrangement comprising, in combination, fuel supply means for a combustion engine and including an adjustable throttle control member for controlling the continuously supplied quantity of fuel mixture; an operating device movable to an actuated position for rendering said fuel supply means operative; at least one monostable circuit connected to said operating device for actuating the same and including a timing device operable between an inoperative condition and an operative condition for rendering said fuel supply means operative, and passing to said inoperative condition after a variable time period depending on the voltage supplied, said timing device including a capacitor and a resistor; alternating current generator means driven by said combustion engine, and having a first winding for producing a first variable voltage and a second winding for producing a second variable voltage, said variable voltages depending on the rotary speed of said combustion engine; first circuit means connecting said first winding with said timing device for supplying said first variable voltage to the same and including rectifier means, at least one non-linear resistance, at least one frequency responsive compensating resistance means, and at least two transistors; and second circuit means connecting said second winding with said timing device for supplying said second variable voltage to the same and including rectifier means and a potentiometer having a movable tap member connected to said throttle control member for movement with the same whereby said second variable voltage is modified in accordance with the amount of fuel mixture continuously supplied to the combustion engine during said time period.

12. Fuel control arrangement as set forth in claim 11 wherein said timing device is connected to the base of one of said transistors, and including two resistors connected to each other and being connected to the collector of other of said transistors, the connecting point between said two resistors being connected to said timing device so that the same connects said point with said base, and including two further resistors connected in series to said timing device and being respectively connected to said first and said second windings of said generator means.

13. A fuel control arrangement as set forth in claim 12 wherein the resistance of said further resistors is selected so that the voltage differential along the same caused by the current charging said capacitor of said timing device at least partly compensates the voltage components of said first and second variable voltages on said further resistors.

14. Fuel control arrangement comprising, in combination, an electrical operating device movable to an actuated position for rendering operative the fuel supply means of a combustion engine; a first monostable circuit including a first timing device operable between an inoperative condition and an operative condition, and passing from said operative condition to said inoperative condition after a first variable time period; a second monostable circuit connected to said operating device and including a second timing device operable between an inoperative condition and an operative condition for holding said operating device in said actuated position, said second timing device passing from said operative condition to said inoperative condition after another variable time period, said second monostable circuit being connected to and controlled by said first monostable circuit for placing said second timing device in said operative condition when said first timing device has passed to said inoperative position, said second monostable circuit including temperature responsive means adapted to be placed in contact with the cooling water of the combustion engine and associated with said second timing device for varying said other variable time period in accordance with the temperature of the cooling water; and means adapted to be controlled by said combustion engine for producing a variable voltage depending on the rotary speed of said combustion engine, said means being electrically connected to said first timing device and controlling the same to vary said first variable time period in accordance with said variable voltage and thereby depending on the rotary speed of the combustion engine whereby the time periods during which said fuel supply means supply fuel to said combustion engine are varied depending on the rotary speed of said combustion engine and on the temperature of the cooling water of the engine.

15. Fuel control arrangement comprising, in combination, fuel supply means for a combustion engine and including an adjustable throttle control member movable between a plurality of control positions for controlling the continuously supplied quantity of fuel mixture; an electrical operating device movable to an actuated position for rendering operative said fuel supply means; a first monostable circuit including a first timing device operable between an inoperative condition and an operative condition, and passing from said operative condition to said inoperative condition after a first variable time period; a second monostable circuit connected to said operating device and including a second timing device operable between an inoperative condition and an operative condition for holding said operating device in said actuated position, said second timing device passing from said operative condition to said inoperative condition after another variable time period, said second monostable circuit being connected to and controlled by said first monostable circuit for placing said second timing device in said operative condition when said first timing device has passed to said inoperative position, said second monostable circuit including temperature responsive means adapted to be placed in contact with the cooling water of the combustion engine and associated with said second timing device for varying said other variable time period in accordance with the temperature of the cooling water; generator means driven from said combustion engine for producing a variable voltage depending on the rotary speed of said combustion engine; and circuit means connecting said generator means with said first timing device and including means controlled by said throttle control member in accordance with the control positions of the same to modify the variable voltage supplied to said first timing device, said modified voltage at least partly controlling said first timing device to vary said first variable time period depending on the rotary speed of the combustion engine and on the quantity of fuel mixture continuously supplied to said combustion engine during both said time periods whereby the time periods during which said fuel supply means continuously supply said quantity of fuel mixture to said combustion engine vary depending on the rotary speed of said combustion engine, the position of said throttle control member and on the temperature of the cooling water of the engine.

16. Fuel control arrangement comprising, in combination, an electrical operating device movable to an actuated position for rendering operative the fuel supply means of a combustion engine; a first monostable circuit including a first timing device operable between an inoperative condition and an operative condition, and passing from said operative condition to said inoperative condition after a first variable time period, said first timing device including a capacitor and a resistor; a second monostable circuit connected to said operating device and including a second timing device operable between an inoperative condition and an operative condition for holding said operating device in said actuated position, said second timing device passing from said operative condition to said inoperative condition after another variable time period, said second timing device including a capacitor and a resistor; a connecting capacitor connecting said second monostable circuit to said second monostable circuit, said first monostable circuit placing said second timing device in said operative condition when said first timing device has passed to said inoperative position, said second monostable circuit including temperature responsive means adapted to be placed in contact with the cooling water of the combustion engine and associated with said second timing device for varying said other variable time period in accordance with the temperature of the cooling water; and means adapted to be controlled by said combustion engine for producing a variable voltage depending on the rotary speed of said combustion engine, said means being electrically connected to said first timing device and controlling the same to vary said first variable time period in accordance with said variable voltage and thereby depending on the rotary speed of the combustion engine whereby the time periods during which said fuel supply means supply fuel to said combustion engine are varied depending on the rotary speed of said combustion engine and on the temperature of the cooling water of the engine.

17. Fuel control arrangement comprising, in combination, an electrical operating device movable to an actuated position for rendering operative the fuel supply means of a combustion engine; a first monostable circuit including a first timing device operable between an inoperative condition and an operative condition, and passing from said operative condition to said inoperative condition after a first variable time period, said first timing device including a capacitor and a resistor; a second monostable circuit connected to said operating device and including a second timing device operable between an inoperative condition and an operative condition for holding said operating device in said actuated position, said second timing device passing from said operative condition to said inoperative condition after another variable time period, said second timing device including a capacitor and a resistor; a connecting capacitor collecting said second monostable circuit to said second monostable circuit said first monostable circuit for placing said second timing device in said operative condition when said first timing device has passed to said inoperative position, said second monostable circuit including temperature responsive means adapted to be placed in contact with the cooling water of the combustion engine and associated with said second timing device for varying said other variable time period in accordance with the temperature of the cooling water; alternating current generator means driven by said combustion engine for producing a variable voltage depending on the rotary speed of said combustion engine; and circuit means connecting said generator means with said first timing device and including rectifier means and at least one frequency responsive resistance, said first timing device being controlled by the rectified variable voltage for varying said first variable time period in accordance with said rectified variable voltage and thereby depending on the rotary speed of the combustion engine whereby the time periods during which said fuel supply means supply fuel to said combustion engine are varied depending on the rotary speed of said combustion engine and on the temperature of the cooling water of the engine.

18. Fuel control arrangement comprising, in combination, an electrical operating device for operating the fuel supply means of a combustion engine; at least one monostable circuit connected to said operating device for actuating the same, and including a timing device operable between an inoperative condition, and an operative condition for holding said operating device actuated, and passing from said operative condition to said inoperative condition after a variable time period; a cam means driven by said combustion engine and operatively connected to said monostable circuit for placing said timing device in said operative condition in a timed relationship with the strokes of the combustion engine; and means adapted to be controlled by said combustion engine for producing a variable voltage depending on the rotary speed of said combustion engine, said means being electrically connected to said timing device and controlling the same to vary said variable time period in accordance with said variable voltage and thereby depending on the rotary speed of the combustion engine whereby the time periods during which said fuel supply means supply fuel to said combustion engine are varied depending on the rotary speed of said combustion engine.

19. Fuel control arrangement comprising, in combination, fuel supply means for a combustion engine and including an adjustable throttle control member for controlling the continuously supplied quantity of fuel mixture; an operating device movable to an actuated position for rendering said fuel supply means operative; at least one monostable circuit connected to said operating device for actuating the same and including a timing device operable between an inoperative condition and an operative condition for rendering said fuel supply means operative; and passing to said inoperative condition after a variable time period depending on the voltage supplied, said timing device including a capacitor and a resistor; a cam means driven by said combustion engine and operatively conected to said monostable circuit for placing said timing device in said operative condition in a timed relationship with the strokes of the combustion enigne; alternating current generator means driven by said combustion engine, and having a first winding for producing a first variable voltage and a second winding for producing a second variable voltage, said variable voltages depending on the rotary speed of said combustion engine; first circuit means connecting said first winding with said timing device for supplying said first variable voltage to the same and including rectifier means, at least one non-linear resistance, at least one frequency responsive compensating resistance means, and at least two transistors; and second circuit means connecting said second winding with said timing device for supplying said second variable voltage to the same and including rectifier means and a potentiometer having a movable tap member connected to said throttle control member for movement with the same whereby said second variable voltage is modified in accordance with the amount of fuel mixture continuously supplied to the combustion engine during said time period.

20. Fuel control arrangement comprising, in combination, fuel supply means for a combustion engine and including an adjustable throttle control member movable between a plurality of control positions for controlling the continuously supplied quantity of fuel mixture; an electrical operating device movable to an actuated position for rendering operative said fuel supply means; a first monostable circuit including a first timing device operable between an inoperative condition and an operative condition, and passing from said operative condition to said inoperative condition after a first variable time period; a cam means driven by said combustion engine and operatively connected to said monostable circuit for placing said first timing device in said operative condition in a timed relationship with the strokes of the combustion engine; a second monostable circuit connected to said operating device and including a second timing device operable between an inoperative condition and an operative condition for holding said operating device in said actuated position, said second timing device passing from said operative condition to said inoperative condition after another variable time period, said second monostable circuit being connected to and controlled by said first monostable circuit for placing said second timing device in said operative condition when said first timing device has passed to said inoperative position, said second monostable circuit including temperature responsive means adapted to be placed in contact with the cooling water of the combustion engine and associated with said second timing device for varying said other variable time period in accordance with the temperature of the cooling water; generator means driven from said combustion engine for producing a variable voltage depending on the rotary speed of said combustion engine; and circuit means connecting said generator means with said first timing device and including means controlled by said throttle control member in accordance with the control positions of the same to modify the variable voltage supplied to said first timing device, said modified voltage at least partly controlling said first timing device to vary said first variable time period depending on the rotary speed of the combustion engine and on the quantity of fuel mixture continuously supplied to said combustion engine during both said time periods whereby the time periods during which said fuel supply means continuously supply said quantity of fuel mixture to said combustion engine vary depending on the rotary speed of said combustion engine the position of said throttle control member and on the temperature of the cooling water of the engine.

References Cited in the file of this patent

UNITED STATES PATENTS

| | | |
|---|---|---|
| 2,815,009 | Pribble | Dec. 3, 1957 |
| 2,859,738 | Campbell | Nov. 11, 1958 |
| 2,864,354 | Bartz | Dec. 16, 1958 |

FOREIGN PATENTS

| | | |
|---|---|---|
| 971,274 | France | July 5, 1950 |